US005948091A

United States Patent [19]

Kerigan et al.

[11] Patent Number: 5,948,091

[45] Date of Patent: Sep. 7, 1999

[54] UNIVERSAL DIGITAL DISPLAY INTERFACE

[75] Inventors: Shaun Kerigan, Kilmacolm, United Kingdom; William J. Sexton, The Colony, Tex.; Douglas M. Fix, Allen, Tex.; Gregory Hewlett, Garland, Tex.

[73] Assignee: Texas Instruments Incorporated, Dallas, Tex.

[21] Appl. No.: 08/756,668

[22] Filed: Nov. 26, 1996

Related U.S. Application Data

[60] Provisional application No. 60/007,841, Dec. 1, 1995.

[51] Int. Cl.[6] .......................... G06F 13/38; G06F 13/00; G06F 9/445

[52] U.S. Cl. .......................... 710/129; 710/104; 713/1

[58] Field of Search .......................... 395/284, 285, 395/309, 651–653; 710/104, 105, 129, 130; 713/1–3

[56] References Cited

U.S. PATENT DOCUMENTS

| | | | |
|---|---|---|---|
| 5,247,682 | 9/1993 | Kondou et al. | 395/651 |
| 5,291,585 | 3/1994 | Sato et al. | 395/500 |
| 5,418,960 | 5/1995 | Munroe | 395/651 |
| 5,454,081 | 9/1995 | Thome | 395/281 |
| 5,512,964 | 4/1996 | Kim | 348/806 |
| 5,530,887 | 6/1996 | Harper et al. | 395/284 |
| 5,543,691 | 8/1996 | Palevsky et al. | 315/366 |
| 5,546,595 | 8/1996 | Norman et al. | 395/830 |
| 5,557,691 | 9/1996 | Izuta | 382/299 |
| 5,592,678 | 1/1997 | Cook et al. | 395/681 |
| 5,668,992 | 9/1997 | Hammer et al. | 395/651 |
| 5,687,371 | 11/1997 | Lee et al. | 395/651 |
| 5,758,177 | 5/1998 | Gulick et al. | 395/800.01 |
| 5,802,318 | 9/1998 | Murray | 395/280 |

FOREIGN PATENT DOCUMENTS

| | | |
|---|---|---|
| 0 543 089 A2 | 8/1992 | European Pat. Off. . |
| 0 612 053 A1 | 2/1994 | European Pat. Off. . |

OTHER PUBLICATIONS

"The Indispensable PC Hardware Book" Messmer 1995 pp. 11–13.

"Intelligent Tilt/Swivel with Protocol Conversion," *IBM Technical Disclosure Bulletin*, vol. 38 No. 08, Aug. 1995, p. 573.

*Primary Examiner*—Glenn A. Auve
*Assistant Examiner*—Paul R. Myers
*Attorney, Agent, or Firm*—Charles A. Brill; Frederick J. Telecky, Jr.; Richard L. Donaldson

[57] ABSTRACT

A digital display device interface for a host system (12) and its display device (14) and peripherals. The interface has separate logical and physical levels, thereby making the interface independent of any hardware configuration or connector. The initialization logic level allows dynamic configuration of the system upon power up or initialization. The display data level (30) controls the video data sent for display in a continuous, full bandwidth data stream. The I/O data level (32) controls communications between peripheral devices (18*a* . . . 18*x*) connected to the display device (14) and the system (12).

6 Claims, 1 Drawing Sheet

UNIVERSAL DIGITAL DISPLAY INTERFACE

This invention claims priority from Provisional application No. 60/007,841 filed Dec. 1, 1995.

BACKGROUND OF THE INVENTION

1. Field of the Invention

This invention relates to computer display devices (projectors, direct view flat panels, etc.), more particularly to those display devices intended for use with a wide range of computer interfaces.

2. Background of the Invention

The typical system display, such as a computer and workstation display device, has a cathode-ray tube (CRT) driven display. This type of display device displays data in an analog fashion. The computer system creates the image data in the digital domain and must convert it to analog data before transferring it to the display device.

The display device may have the capability to further process the data before displaying it. With the advent of fast and powerful digital signal processors, the display device may need data in digital format in order to perform digital processing. In this case, the data must be reconverted back to digital, processed, reconverted back to analog and then displayed. This induces noise and instability in the data resulting from the analog to digital converter's sampling of the digital data.

Regardless of how the display device processes the data, the conversion from digital to analog currently occurs before sending the data to the display device, even if the display device is itself digital, since the current standard is analog. With the move to a more digital world, digital display devices have become a more available option for computer systems. Additionally, not only is it desirable for the video signals to be digital, but a digital data stream can easily include distinct data signals for control of the system and the display device.

Therefore, a need exists for a display device interface that supports both analog and digital formats and eliminates any unnecessary transformation between the two.

SUMMARY OF THE INVENTION

One aspect of the invention includes a digital display device interface that separates the interface procedures from the hardware configuration. The interface defines a logical procedure layer, which includes an initialization level, a data display level and a I/O data level. The interface also defines an electrical connection layer and a physical mechanical layer. The electrical connection layer contains several options for connection architectures and standards for both the display data level and the I/O data level. The mechanical level merges the electrical connection options to a connector which connects the display device to a host system.

It is one advantage of the invention that it allows digital and analog display devices to be used with the same procedures.

It is one advantage of the invention in that the procedures are independent of the hardware, making the interface more robust and interoperable.

It is one advantage of the invention in that it allows a plug and play configuration for peripherals and display devices.

It is one advantage of the invention in that it provides a coherent framework irrespective of the display device for display of data through a flexible display device interface.

It is one advantage of the invention that both existing and new bus standards can be utilized seamlessly for both control and display of data.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Figure 1:
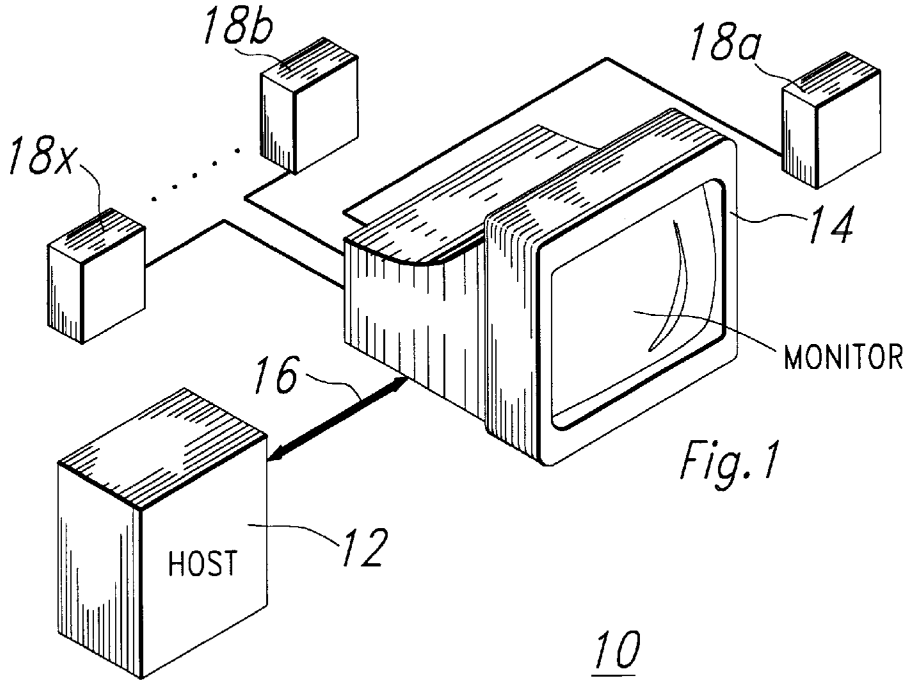
FIG. 1 shows a block diagram of a host system with a digital display device and peripherals.

FIG. 1 shows a computer system 10 with a host system 12 and a display device 14. The host system may be any type of workstation or computer that generates one of several different types of video data to be displayed. The display device 14 has connected to it peripherals 18*a*, 18*b* . . . 18*x*. The connection 16 allows the host system 12 and the display device 14 to communicate as well as allowing the peripherals 18*a* . . . 18*x* to communicate with the host.

The host computer has a digital display device interface that allows it to use one of several hardware configurations and a selection of available peripherals. The configuration remains flexible, since the host sends queries via the interface to the display device and other peripherals to gather the information necessary to configure the channels of communication.

Figure 2:
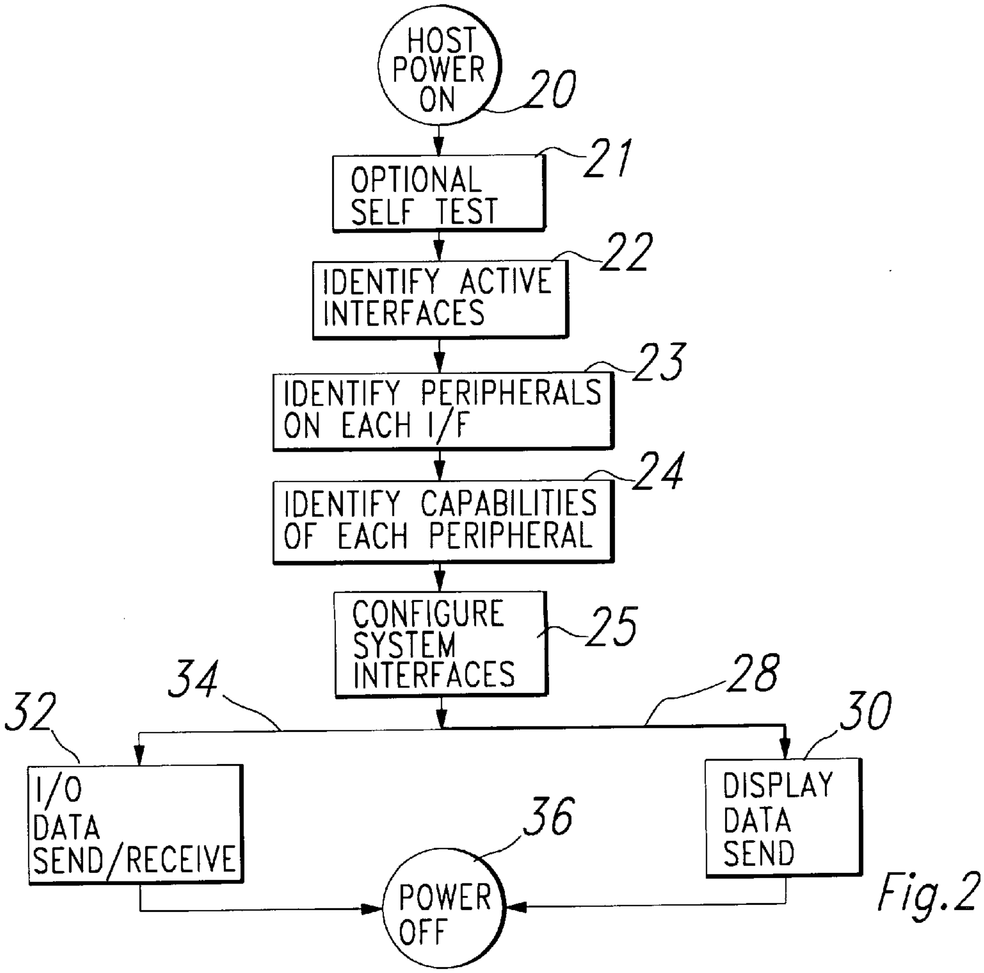
FIG. 2 shows a flowchart of the process for initializing and operating a display device using one embodiment of a digital display device interface standard.

FIG. 2 shows a process by which the host computer configures its communications to be able to send display data and receive input from peripherals through its digital display device interface (or digital monitor interface, DMI). "Digital display device" refers to a display device that displays data digitally or has a fixed pixel format. One aspect of this invention includes the ability to use standard analog displays with hosts that use a digital display device interface, thereby allowing a gradual move to digital displays. Another aspect is that the display adapter may be installed in the display device rather than the host.

For ease of discussion, the interface will be discussed relative to various layers and sublevels. The logical layer includes a display data level, an input/output (I/O) data level, and an initialization level. The physical layer contains two sublayers, an electrical level and a mechanical level. The electrical sublayer has a mandatory element and several optional elements. These consist of an initialization bus element, a high speed, uni-directional bus element, and a medium to high speed bi-directional bus element. The initialization bus is mandatory and at least one of the remaining bus elements is mandatory with both being optional. The initialization bus element is intended to interface directly with the initialization level of the logical layer. The remaining two bus elements flexibly map back to both the I/O data level and the display data level of the logical layer.

The mechanical level brings the mandatory electrical element with the optional elements and their respective logical levels together at the connector. The discussion will begin with the logical level.

Following power on, in step 20, the interface begins to gather the necessary data to configure the communications channels between the system, display device and other peripherals. The power on step could also equate to a system boot, or any instance when the operating system loads or initializes. At initialization, the host and peripherals may optionally run internal self test routines to ascertain their ability to function and communicate via the available interfaces, shown at step 21 in FIG. 2. The host system will then perform a series of steps as shown in steps 22–25 in FIG. 2, to identify what buses are available, which peripherals are connected to each bus and to configure the interface accordingly. The display device will at this time send a digital extended display identification (DEDID) to the host via the mandatory initialization bus element. The DEDID provides the host information on the display device's functional capabilities, interface capabilities, default settings and option status for further host configuration.

Note that the peripherals 18*a* . . . 18*x*, such as a mouse, camera, keyboard, etc. are connected to or through the display device 14 in FIG. 1. In the workstation or PC environment, this is considered desirable. The host system may sit on the floor, or be a server that sits in another room. Connecting the peripherals through the display device prevents extra cables and allows for ease of connection and disconnection. The peripherals may communicate to the display device and the display device relays the information, if the display device has some type of on board intelligence, or the display device may just pass the information to the host system without any interaction with it.

Referring back to FIG. 2, once the interface has completed the initialization, the next two steps in the process occur somewhat simultaneously. As shown by the larger arrow 28, the step of sending display data 30 involves a larger amount of data traveling from the host to the display device, normally along the high speed, uni-directional bus. This data stream consists of a continuous stream of real-time pixel data sent at the full bandwidth of the system. In one embodiment of the invention, this data stream is 24 bits per color, three colors.

In contrast, the data being sent at step 32, at the I/O data level is intermittent and can be uni-directional or bi-directional. Peripherals, such as keyboards, pointing devices, cameras, etc., send their inputs to the host system. The host system then changes the display data in step 30 to account for these new inputs as necessary. This change only occurs when the peripherals have sent in new data, or the application on the host system has changed. An example of new information might be OpenGL commands to the display adapter or brightness or focus adjustments to an optical projector. An example of an application that may require the use of this channel might be software that allows transfer of compressed video.

At initial program load, or startup, some initialization communication may be performed along the optional I/O data link. The specific information of the configuration of the system must be identified and communicated to the host via the DEDID. The display device interface is designed to support several different architectures and components. However, in order for the system to function, the display device must send specific information beyond that defined in the DEDID for that particular set of components. This could be sent along a bi-directional bus as codes identifying such things as pointing device information, diagnostic information, etc. The host system would then tailor the functionality of the display device with display parameters, such as the number of display data channels enabled, display data channel type (LVDS, fiber, analog, etc.), addressability of the display, selected color temperature, update and refresh rates, etc.

The following tables illustrate the process of FIG. 2 in a slightly different format.

TABLE I

| DMI Architecture | |
|---|---|
| LEVEL | DESCRIPTION/EXAMPLES |
| DISPLAY | Displayable Decoded Information |
| | Full bandwidth analog |
| | Full bandwidth digital |
| | Displayable Encoded Information |
| | Compressed video |
| | Graphic Primitives (draw and move) |
| | Graphic orders (OpenGL) |
| I/O DATA LEVEL | Digital audio |
| | Camera Video In |
| | Keyboards |
| | Pointing devices (pens, mice) |
| | Scanners |
| | Display control |
| INITIALIZATION LEVEL | DEDID |
| | Monitor fimction, default settings, data channels supported etc. |

TABLE II

| DMI Host Software Architecture and Mechanical Level | | | | | | | | |
|---|---|---|---|---|---|---|---|---|
| App-1 | | App-2 | | App-3 | . . . | App-N | | |
| API(s) | | | | | | | | |
| Operating System | | | | | | | | |
| Component Interfaces | | | | | | | | |
| Device drivers | display control | point | pen | mouse | displayable decoded data | mon. init. | full motion video | keyboard |
| Logic Layer | I/O Data Level | | | | Display Level | | Init. Level | |
| Elec. Layer | Med.-High speed, bi-directional bus (USB, P1394) | | | | High Speed Uni-directional bus (LVDS, Fiber an analog) | | DDC1 | |
| Mech Layer | Cables, coaxial, fiber, twisted pair, connector, etc. (CONN01, CONN02 . . . CONNX) | | | | | | | |

In Table II, the three-level interface of Table I become part of the host architecture. The first three rows of Table II show software on the host system that typically runs on all systems, from the application software to the operating system. The component interfaces may be different from one operating system or host system to another, as might the list of peripheral devices. Between the peripheral control, which is in software, and the physical layer lies the DMI. The first level of the DMI is the logical layer, shown in Table I. The second level of the DMI is the electrical physical layer, shown on the second to the last row of Table II.

The electrical layer can support several different types of bus and connector architectures, including those shown. The only required element in the electrical level is a Display Data Channel (DDC1), its power (+5V) and ground and either the Med-High speed bi-directional bus or the High speed, uni-directional bus (or both are also valid). The host system reads this information out of an EEPROM or ROM on the monitor on DDC1 initialization interface to the system to allow the configuration during power on or operating system load.

Other connections supported by embodiments of the DMI can be related back to the display level and I/O data level of FIG. 2. In the "basic" embodiment the Med-High speed, bi-directional bus relates back to the I/O data level an the High-speed, uni-directional bus relates back to the display level. In more advanced embodiments, the electrical layer data bus may serve either or both the I/O data level and display data levels of the logical layer.

In the basic embodiment of the display level, the connections supported include an LVDS (low voltage differential signal) for high speed video data transmission with many channels, and a fiber optic link, among other embodiments. Additionally, in the display data level, the optional analog interface will support display devices that run an analog standard, such as cathode-ray tube (CRT) based systems. In the basic embodiment of the I/O data level, connections supported include High-speed, bi-directional data buses such as IEEE 1394, universal serial bus (USB), VESA (Video Electronics Standards Association) standards DDC2b, Philips $I^2C$, DDC2ab (access bus), and Q-ring (QuickRing by Apple Computer, Inc)., among others.

All of these optional electrical layer connections, which are supported by the various logical layers discussed above, merge with the connector at the mechanical physical level. In addition, the connector at the mechanical physical level includes the mandatory electrical level interface for the DDC connection.

The mechanical physical level can be configured in several ways. These are the actual connectors on the display device that allows it to communicate with the host system. If the display device is being manufactured for a single purpose, an off-the-shelf connector could be purchased and the software configured to access the signals on that connector in a certain way. One example of this is a connector that for discussion purposes will be referred to as CONN01.

CONN01 from Table II, for example, may be selected from off the shelf connectors to support a subset of available interconnection options. One example would be a connector that supports the DDC interface, two LVDS, IEEE1394 and the analog standard. One example of an available connector would be Molex Inc.'s part number SD-71182-1000. Another connector example will be referred to as CONN02. CONN02 might support the DDC1, LVDS, IEEE 1394, USB and the analog interface.

Ideally, one universal configurable connector will be used to support all of the available options, except fiber optic. However, even with the special needs for fiber optic input (a fiber optic switch or cable connector), it may be possible to obtain or build a connector that has all of the electrical connections necessary to support all of the available options and the fiber optic connection as well. In no way are the above example intended to limit the applications for which these connectors will be used.

Regardless of the actual connector used, or the limitations upon the alternatives based upon the connector used, the logical levels remain separate from the physical levels such that the software is not dependent upon any particular hardware configuration, nor on any particular operating system. This allows such features as plug and play interface components and video drivers.

Thus, although there has been described to this point a particular embodiment for a method and structure for a digital display device interface, it is not intended that such specific references be considered as limitations upon the scope of this invention except in-so-far as set forth in the following claims.

What is claimed is:

1. A host system with a display device connected by a universal display device interface, said universal display device interface comprising:

- an initialization bus operable to interface between said host system and said display device so as to set up communication of specific information between said host and any peripheral devices including said display device and to transfer a subset of said specific information with regard to said display device to said host system, wherein said subset includes information identifying a bus type and speed, and a connector type, such that said host system is operable to use this information to define and configure said interface for said display device;
- a uni-directional bus operable to transfer said specific information with regard to said display device to said display device from said host system and to transfer display data; and
- an optional bi-directional bus for transferring data between said host system and said display device.

2. The system as claimed in claim 1 wherein said displayable data further comprises encoded data.

3. The system as claimed in claim 1 wherein said displayable data further comprises decoded data.

4. A host system with a display device connected by a universal display device interface, said universal display device interface comprising:

- an initialization bus operable to interface between said host system and said display device so as to set up communication of specific information between said host and any peripheral devices including said display device and to transfer a subset of said specific information with regard to said display device to said host system, wherein said subset includes information identifying a bus type and speed, and a connector type, such that said host system is operable to use this information to define and configure said interface for said display device;
- a bi-directional bus operable to transfer said specific information with regard to said display device between said display device and said host system and to transfer display data; and
- an optional uni-directional bus for transferring data between said host system and said display device.

5. The system as claimed in claim 4 wherein said displayable data further comprises encoded data.

6. The system as claimed in claim 4 wherein said displayable data further comprises decoded data.

* * * * *

UNITED STATES PATENT AND TRADEMARK OFFICE

CERTIFICATE OF CORRECTION

PATENT NO. : 5,948,091

DATED : September 7, 1999

INVENTOR(S) : Shaun Kerigan, William J. Sexton, Douglas M. Fix and Gregory Hewlett

It is certified that error appears in the above-identified patent and that said Letters Patent is hereby corrected as shown below:

Cover Page, Item [73], Assignee:

change "Texas Instruments Incorporated, Dallas, Tex."

to --Texas Instruments Incorporated, Dallas, Tex. and International Business Machines Corporation, Armonk, New York--

Signed and Sealed this

Thirty-first Day of October, 2000

*Attest:*

Q. TODD DICKINSON

*Attesting Officer*

*Director of Patents and Trademarks*